(12) United States Patent
Malischewski et al.

(10) Patent No.: US 11,852,096 B2
(45) Date of Patent: Dec. 26, 2023

(54) METHOD FOR OPERATING AN INTERNAL COMBUSTION ENGINE

(71) Applicant: MAN Truck & Bus SE, Munich (DE)

(72) Inventors: Thomas Malischewski, Munich (DE); Bruno Barciela Díaz-Blanco, Munich (DE)

(73) Assignee: MAN Truck & Bus SE, Munich (DE)

( * ) Notice: Subject to any disclaimer, the term of this patent is extended or adjusted under 35 U.S.C. 154(b) by 0 days.

(21) Appl. No.: 17/642,427

(22) PCT Filed: Sep. 4, 2020

(86) PCT No.: PCT/EP2020/074815
§ 371 (c)(1),
(2) Date: Mar. 11, 2022

(87) PCT Pub. No.: WO2021/048024
PCT Pub. Date: Mar. 18, 2021

(65) Prior Publication Data
US 2022/0341371 A1 Oct. 27, 2022

(30) Foreign Application Priority Data
Sep. 12, 2019 (DE) .......................... 102019006486.0

(51) Int. Cl.
*F02D 41/00* (2006.01)
*F02D 41/40* (2006.01)
(Continued)

(52) U.S. Cl.
CPC ............ *F02D 41/403* (2013.01); *F02B 19/12* (2013.01); *F02B 19/14* (2013.01); *F02B 19/18* (2013.01);
(Continued)

(58) Field of Classification Search
CPC .. F02D 41/0027; F02D 41/402; F02D 19/022; F02D 19/024; F02M 21/0215;
(Continued)

(56) References Cited

U.S. PATENT DOCUMENTS 2,799,255 A * 7/1957 Gehres ............... F02M 21/0269
123/1 R
6,935,284 B2 * 8/2005 Qian ....................... F02B 43/10
123/3
(Continued)

FOREIGN PATENT DOCUMENTS

AT        6290 U1    7/2003
DE     4419429 C2    7/1998
(Continued)

OTHER PUBLICATIONS

German Search Report issued in German Patent Application No. 102019006486.0 dated May 14, 2020, 6 pages. English translation not available.
(Continued)

*Primary Examiner* — Phutthiwat Wongwian
*Assistant Examiner* — Sherman D Manley
(74) *Attorney, Agent, or Firm* — WEBER ROSSELLI & CANNON LLP

(57) ABSTRACT

The present disclosure relates to a method for operating a combustion engine. A main amount of gas fuel is fed via a pre-chamber into a main combustion chamber. An ignition quantity of gas fuel is fed into the pre-chamber before the piston reaches the upper dead center to form an air-gas fuel mixture in the pre-chamber, which is fatter than in the main combustion chamber. The air-gas fuel mixture in the pre-chamber ignites itself. The air-gas fuel mixture in the main combustion chamber ignites through the self-ignited air-gas fuel mixture in the pre-chamber.

20 Claims, 2 Drawing Sheets

(51) Int. Cl.
*F02B 19/12* (2006.01)
*F02B 19/14* (2006.01)
*F02B 19/18* (2006.01)
*F02M 21/02* (2006.01)
*F02M 51/06* (2006.01)
*F02P 19/02* (2006.01)

(52) U.S. Cl.
CPC ..... *F02D 41/0027* (2013.01); *F02M 21/0215* (2013.01); *F02M 21/0248* (2013.01); *F02M 51/061* (2013.01); *F02P 19/02* (2013.01)

(58) Field of Classification Search
CPC ........... F02M 21/0248; F02M 21/0209; F02M 21/0254; F02M 51/061; F02P 19/02; F02B 19/1014; F02B 19/10; F02B 19/108; F02B 19/1085; F02B 2019/002; F02B 2019/006; Y02T 10/12; Y02T 10/30
See application file for complete search history.

(56) References Cited

U.S. PATENT DOCUMENTS

| | | | |
|---|---|---|---|
| 8,925,518 B1 | 1/2015 | Riley et al. | |
| 9,822,692 B2* | 11/2017 | Könczöl | F02B 43/00 |
| 9,890,689 B2* | 2/2018 | Hampson | F02D 41/3005 |
| 9,903,264 B1* | 2/2018 | Yeager | F02D 35/023 |
| 11,078,826 B1* | 8/2021 | Chang | F02M 21/0275 |
| 2003/0116121 A1* | 6/2003 | Agama | F02B 1/12 |
| | | | 123/259 |
| 2003/0196634 A1* | 10/2003 | Lausch | F02B 19/12 |
| | | | 123/275 |
| 2015/0020769 A1* | 1/2015 | Huang | F02M 61/1813 |
| | | | 123/145 R |
| 2015/0369177 A1* | 12/2015 | Coldren | F02M 51/0603 |
| | | | 123/294 |
| 2015/0369192 A1* | 12/2015 | Ge | F02M 45/086 |
| | | | 239/584 |
| 2016/0017845 A1* | 1/2016 | Huang | F02M 21/0221 |
| | | | 123/495 |
| 2016/0326970 A1* | 11/2016 | Fei | F02D 19/0694 |
| 2016/0348570 A1* | 12/2016 | Willi | F02B 19/12 |
| 2017/0166289 A1* | 6/2017 | Dahlberg | F01N 3/208 |
| 2017/0284320 A1* | 10/2017 | Holst | F02D 41/0027 |
| 2017/0306917 A1* | 10/2017 | Kim | F02M 26/44 |
| 2018/0038269 A1* | 2/2018 | Willi | F02D 41/3005 |
| 2018/0142632 A1* | 5/2018 | Martin | F02M 21/0263 |

FOREIGN PATENT DOCUMENTS

| | | |
|---|---|---|
| DE | 102007060560 A1 | 6/2009 |
| DE | 102015202193 A1 | 8/2016 |
| EP | 2998539 B1 | 9/2019 |
| JP | 2018066369 A | 4/2018 |
| WO | 2018141589 A1 | 8/2018 |

OTHER PUBLICATIONS

PCT Search Report and Written Opinion issued in PCT Application PCT/EP2020/074815 dated Nov. 23, 2020 with English translation of ISR.

* cited by examiner

METHOD FOR OPERATING AN INTERNAL COMBUSTION ENGINE

CROSS-REFERENCE TO RELATED APPLICATION

This application is a U.S. National Stage Entry filed under 35 U.S.C. § 371 of International Application No. PCT/EP2020/074815, filed on Sep. 4, 2020, which claims the benefit of, and priority to, German Application No. DE 10 2019 006 486.0, filed on Sep. 12, 2019, the entire content of each of which is incorporated by reference herein.

BACKGROUND

Technical Field

The present disclosure relates to a method for operating an internal combustion engine, preferably a single-fuel internal combustion engine, with a gas fuel. The present disclosure further relates to an internal combustion engine and a motor vehicle having an internal combustion engine.

Background of Related Art

In order to operate a gas fuel internal combustion engine, the so-called HPDI method can be used (High Pressure Direct Injection). In this combustion method, methane is required as a gas fuel and diesel is required as a liquid fuel. In this instance, the methane and the diesel can be guided separately in an injector. Firstly, a pilot mass of approximately from 3 mg to 10 mg diesel is injected in the region of the top dead center. As a result of the properties of the diesel (low ignition temperatures), an immediate combustion takes place. A localized significant temperature increase thereby takes place. The main quantity of methane is then injected in the second step. As a result of the previous temperature increase, an immediate combustion of the methane also takes place.

The disadvantage of this method may be the diesel fuel which is still required and as a result of which the system complexity increases significantly and the complete CO2 saving potential cannot be exploited.

DE 44 19 429 C2 discloses a method for operating a self-igniting admixture-compressing internal combustion engine, having a gaseous fuel which is supplied to a prechamber and which forms a fuel-rich mixture at that location, and having a main combustion chamber in which a gaseous fuel/air admixture is drawn. The gaseous fuel is blown into the prechamber at a pressure which is above the compression end pressure in the main combustion chamber. The gaseous fuel/air admixture for the main combustion chamber is supplied via a low-pressure combustion gas line into an inlet channel upstream of the main combustion chamber.

Another gas-operated internal combustion engine having a prechamber is known from U.S. Pat. No. 2,799,255.

SUMMARY

An object of the present disclosure is to provide an alternative and/or improved technique for operating an internal combustion engine with a gas fuel.

The object of the present disclosure is achieved by the features of the main claim. Developments are set out in the dependent claims and the description.

According to an aspect, the present disclosure is based on a method for operating an internal combustion engine, such as, for example, a single-fuel internal combustion engine, having a main combustion chamber and a prechamber which are connected in fluid terms. The method involves supplying (for example, blowing in) a main quantity of gas fuel, such as methane or natural gas, into the main combustion chamber via the prechamber. The method involves compressing and mixing (for example, compressed charge) air and the main quantity of gas fuel to form an air/gas fuel admixture during a movement of a piston in the main combustion chamber to a top dead center of a piston movement of the piston (for example, in a compression cycle). The method involves supplying (for example, blowing in) an ignition quantity of gas fuel, such as methane or natural gas, into the prechamber before the piston reaches the top dead center in order to form in the prechamber an air/gas fuel admixture which is richer than in the main combustion chamber. The method involves self-igniting the air/gas fuel admixture in the prechamber and igniting the air/gas fuel admixture in the main combustion chamber by the self-ignited air/gas fuel admixture in the prechamber.

Aspects of present disclosure enable an internal combustion engine to be operated purely with methane or another gaseous fuel, by means of compression self-ignition of the ignition quantity. No diesel fuel or the like is required as in the HPDI method in order to ignite the gas fuel. The self-ignition of the ignition quantity leads to an ignition of the previously supplied main quantity of gas fuel. The main combustion itself may correspond to a diesel combustion method or be similar thereto. Furthermore, the method enables a comparatively simple construction since, for example, the same gas fuel supply line and/or the same fuel injector can be used to supply the main quantity and the ignition quantity of gas fuel. The system complexity can thereby again be significantly reduced. A lean combustion of the air/gas fuel admixture in the main combustion chamber may prevent excessive nitrogen oxide emissions, in particular under partial load of the internal combustion engine.

In an embodiment, the air and the main quantity of gas fuel are mixed during the compression to form a homogeneous air/fuel admixture in the main combustion chamber. Consequently, the internal combustion engine can be driven by means of a homogeneous lean combustion of the gas fuel.

In an embodiment, the homogeneous air/gas fuel admixture has a combustion air ratio $(\lambda) \geq 2$ and/or $\leq 3$. In embodiments, a self-ignition of the air/gas fuel admixture in the main combustion chamber can thus be prevented.

In another embodiment, the homogeneous air/gas fuel admixture has a combustion air ratio which does not lead to self-ignition of the air/gas fuel admixture in the main combustion chamber.

In another embodiment, the method further involves compressing a portion of the air/gas fuel admixture from the main combustion chamber into the prechamber during the movement of the piston to the top dead center, and in embodiments, after the main quantity of gas fuel has been supplied. It is possible for the ignition quantity to be supplied into the portion of the air/gas fuel admixture which is compressed into the prechamber. Consequently, a richer air/gas fuel admixture which is capable of self-ignition can be formed in a reliable manner in the prechamber.

In another embodiment, the richer air/gas fuel admixture in the prechamber has a combustion air ratio $(\lambda)$ between 0.8 and 1.5, and in embodiments, approximately 1.

It is envisioned that a self-ignition of the richer air/gas fuel admixture in the prechamber can thus be enabled.

In an embodiment, the richer air/gas fuel admixture in the prechamber has a combustion air ratio (λ) which leads to a self-ignition of the richer air/gas fuel admixture in the prechamber.

In another embodiment, the main quantity of gas fuel corresponds to between 90% and 98% of a gas fuel quantity supplied in total per combustion cycle. Alternatively or additionally, the ignition quantity of gas fuel corresponds to between 2% and 10% of a gas fuel quantity supplied in total per combustion cycle. It has been found that this minimum quantity of gas fuel may be sufficient to ensure a reliable self-ignition. In embodiments, the main quantity of gas fuel and the ignition quantity of gas fuel amount to 100% of a gas fuel quantity supplied in total per combustion cycle.

In another embodiment, an effective mean pressure of the method is ≤10 bar, in an embodiment≤9 bar, and in a non-limiting embodiment, 8 bar. It is envisioned that a self-ignition of the air/gas fuel admixture in the main combustion chamber can thus be prevented.

In another embodiment, an effective mean pressure of the method is (for example, adjusted or controlled) such that it does not lead to a self-ignition of the air/gas fuel admixture in the main combustion chamber.

In embodiments, the effective mean pressure can be calculated as a quotient from the work performed (on the crank shaft) and piston displacement of the main combustion chamber(s).

In another embodiment, the ignition quantity of gas fuel is supplied in the region of the top dead center of the piston movement, and in embodiments, shortly before reaching the top dead center and/or in a range between 50° KW (degrees of crank angle) and 0° KW, and in a non-limiting embodiment between 30° KW and 15° KW, before the top dead center.

In a construction variant, the main quantity and the ignition quantity have the same gas fuel, such as methane or natural gas.

In another construction variant, the main quantity of gas fuel is supplied during an inlet cycle and/or a compression cycle, and in embodiments, up to a maximum of 100° KW before the top dead center of the piston movement of the piston. In this manner, the air/gas fuel admixture from the main combustion chamber can be compressed/pushed into the prechamber in order to form a self-igniting admixture with the ignition quantity of gas fuel at that location.

In another construction variant, the method further involves supplying (for example, compressed charge) air into the main combustion chamber, and in embodiments during an inlet cycle. For example, the air can be supplied via an inlet channel of a cylinder head which opens in the main combustion chamber. It is envisioned that the air can be compressed before being supplied by means of a compressor, for example, of a turbocharger subassembly.

In an embodiment, the supply of the ignition quantity and/or the supply of the main quantity is carried out in a gaseous manner.

In another embodiment, the main quantity is supplied temporally before and/or spaced apart from the ignition quantity. It is thus possible, for example, to ensure that the air/gas fuel admixture can be compressed/pushed from the main combustion chamber into the prechamber in order to form a self-ignitable air/gas fuel admixture with the ignition quantity of gas fuel at that location.

In another embodiment, the supply of the ignition quantity and the supply of the main quantity are carried out by the same fuel injector, and in embodiments by the same supply line of the same fuel injector.

In another embodiment, the supply of the ignition quantity and the supply of the main quantity are carried out at the same supply pressure.

It is contemplated that the supply of the main quantity and/or the ignition quantity is carried out by means of a fuel injector which preferably opens directly in the prechamber.

In an embodiment, the supply of the ignition quantity and/or the supply of the main quantity is/are carried out by means of a piezo fuel injector or by means of a fuel injector which is activated by means of an electromagnet.

In another embodiment, an inner side face of the prechamber has a thermal insulator, which in embodiments, may be in the form of a thermally insulating coating. The thermal insulator can minimize a heat transfer between a wall of the prechamber and the gas fuel.

In another embodiment, the step of self-ignition of the air/gas fuel admixture in the prechamber is carried out at least during normal operation of the internal combustion engine (for example, in idle mode, under partial load and/or under full load), and in embodiments, without the use of self-ignition support devices such as a glow plug, etcetera.

In a construction variant, the method further involves remote ignition of the air/gas fuel admixture in the prechamber by means of a spark plug in the case of a cold start of the internal combustion engine and/or a preheating of the prechamber by means of a glow plug and self-ignition of the air/gas fuel admixture in the preheated prechamber in the case of a cold start of the internal combustion engine. It is thus possible, if desired or required, to ensure a reliable ignition of the gas fuel even under cold start conditions.

In an embodiment, the prechamber has a volume in a range between approximately 0.5 cm$^3$ and approximately 2 cm$^3$. Such a small volume may be sufficient to bring the very small pilot quantity of gas fuel together with the compressed air reliably to self-ignition.

In another embodiment, the prechamber is connected to the main combustion chamber by means of one or more through-openings, and in embodiments, 6 to 14 through-openings which are arranged in a distributed manner.

In another embodiment, the prechamber is integrated in a fuel injector for the ignition quantity and/or the main quantity or the prechamber is constructed separately from a fuel injector for the ignition quantity and/or the main quantity.

For example, in the event of a separate construction of the prechamber and fuel injector, the prechamber may be formed at least partially by a cylinder head of the internal combustion engine, by means of a cap element which is fitted to the combustion chamber side of a cylinder head of the internal combustion engine, and/or by means of an assembly sleeve for the fuel injector. When the cap element is used, this element may be screwed, for example, from below into the assembly sleeve.

In an embodiment, the prechamber is arranged centrally with respect to the main combustion chamber.

The present disclosure also relates to a motor vehicle, such as a utility vehicle (for example, truck or bus), having an internal combustion engine which is configured to carry out a method as disclosed herein.

In embodiments, the internal combustion engine may have a electronic control unit which is configured to carry out the method, for example, accordingly controls a fuel injector of the internal combustion engine.

As can be appreciated, the term "control unit" may refer to an electronic system (for example, having microprocessor(s) and data store) which depending on the configuration can take up control tasks and/or regulation tasks.

Even if the term "control" is used herein, the term "regulate" or "control with feedback" may also be included thereby, so to speak.

It is also possible to use the method and the apparatus as disclosed herein for passenger vehicles, large engines, off-road vehicles, stationary engines, marine engines, etcetera.

The preferred embodiments and features of the invention described above can be freely combined with each other.

BRIEF DESCRIPTION OF THE DRAWINGS

Various aspects and features of the present disclosure are described below with reference to the appended drawings, in which.

DETAILED DESCRIPTION

Figure 1:
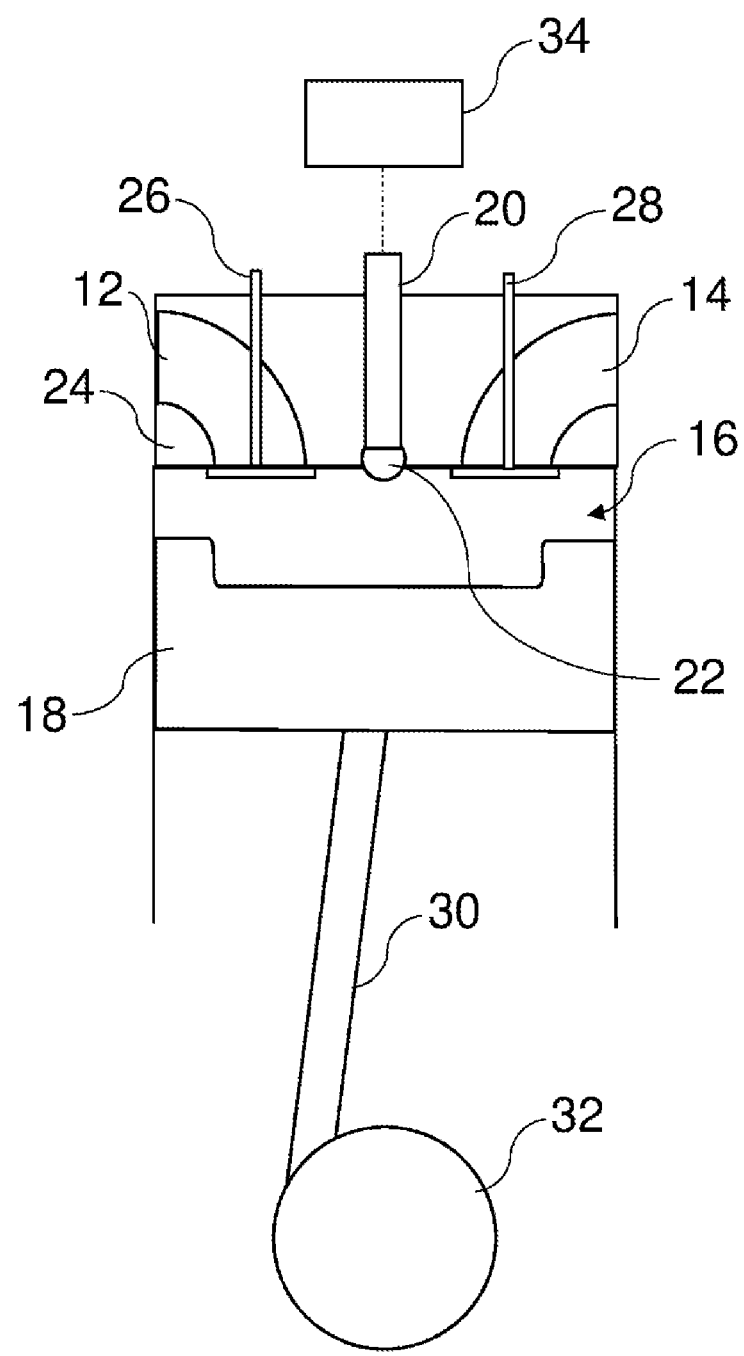
FIG. 1 is a schematic illustration of an internal combustion engine according to an embodiment of the present disclosure.

The embodiments shown in the Figures correspond at least partially so that components which are similar or identical are given the same reference numerals and for the explanation thereof reference may also be made to the description of the other embodiments or Figures in order to avoid repetition.

FIG. 1 shows an internal combustion engine 10. The internal combustion engine 10 is configured as a reciprocating internal combustion engine. In embodiments, the internal combustion engine 10 is configured as a four-cycle internal combustion engine. The internal combustion engine 10 has one or more cylinders. In order to improve clarity, only one cylinder is illustrated in FIG. 1. The internal combustion engine 10 is configured as a single-fuel internal combustion engine for operation using methane (natural gas) as a single fuel. However, the internal combustion engine 10 may, for example, also be operated with another gaseous fuel, for example, hydrogen.

The internal combustion engine 10 may be included in a vehicle, for example, a motor vehicle, a rail vehicle or a water-borne vehicle, for driving the vehicle. In embodiments, the internal combustion engine 10 is included in a utility vehicle, for example, a truck or a bus, for driving the utility vehicle. It is also possible to use the internal combustion engine 10 in a stationary facility, for example, for driving a generator.

The internal combustion engine 10 may have per cylinder at least one air inlet channel 12, at least one exhaust gas outlet channel 14, a main combustion chamber 16, a piston 18, a fuel injector 20, a (for example, single) prechamber (pre-combustion chamber) 22 and a cylinder head 24.

The air inlet channel 12 opens in the main combustion chamber 16. (Charging) air can be supplied to the main combustion chamber 16 via the air inlet channel 12. The air inlet channel 12 is arranged in the cylinder head 24. The cylinder head 24 delimits the main combustion chamber 16 from above. An air supply system may be arranged upstream of the air inlet channel 12. The air supply system may, depending on requirements, have, for example, one or more compressors of a turbocharger subassembly, a charge air cooler and/or an exhaust gas return line.

An aperture opening of the air inlet channel 12 into the main combustion chamber 16 is intended to be opened and closed by means of an air inlet valve 26. In one non-limiting embodiment, the air inlet valve 26 may be a disk valve. The air inlet valve 26 can be activated using any technology, for example, by means of an variable valve drive.

After the combustion, the exhaust gas leaves the main combustion chamber 16 through the exhaust gas outlet channel 14 which is opened by means of an exhaust gas outlet valve 28. The exhaust gas outlet valve 28 may, for example, be configured as a disk valve. The exhaust gas outlet channel 14 is arranged in the cylinder head 24. An exhaust gas system may be arranged downstream of the exhaust gas outlet channel 14. The exhaust gas system may, for example, have one or more exhaust gas turbines of a turbocharger subassembly and/or at least one exhaust gas aftertreatment apparatus. The exhaust gas outlet valve 28 can be activated using any technology, for example, by means of a variable valve drive.

The piston 18 is arranged so as to be able to be moved back and forth in the cylinder. The piston 18 is connected to a crankshaft 32 by means of a connection rod 30. The piston 18 delimits the main combustion chamber 16 in a downward direction. The piston 18 can compress air or an air/fuel admixture in the main combustion chamber 16 when it moves from the bottom dead center to the top dead center.

The fuel injector 20 is constructed as a gas fuel injector, and in embodiments a methane/natural gas injector. The fuel injector 20 is constructed as a single-fuel injector for guiding a single gas fuel. The fuel injector 20 is arranged or configured in such a manner that gas fuel is supplied to the prechamber 22. In embodiments, the fuel injector 20 blows the gas fuel in a gaseous state directly into the prechamber 22. The fuel injector 20 is arranged centrally with respect to the main combustion chamber 16.

The supply by the fuel injector 20 is carried out at a high pressure, for example, in a range between 200 bar and 600 bar. For example, the fuel injector 20 may be fluidically connected to a gas fuel common rail. The gas fuel common rail may supply gas fuel to the fuel injector 20.

The fuel injector 20 is constructed to supply an ignition quantity and a main quantity of gas fuel into the prechamber 22 at different times. The fuel injector 20 may be activated in any manner. In order to also enable a supply of extremely small quantities of gas fuel, the fuel injector 20 may be a piezo fuel injector which can be activated by means of a piezo element, for example, a closure needle of the fuel injector 20 can be raised or lowered in accordance with a state of a piezo element or piezo crystal of the fuel injector 20. For example, it is also possible for the fuel injector 20 to be able to be activated by means of an electromagnet. In embodiments, an activation of the fuel injector 20 may be controlled by means of an electronic control unit 34.

Figure 2:
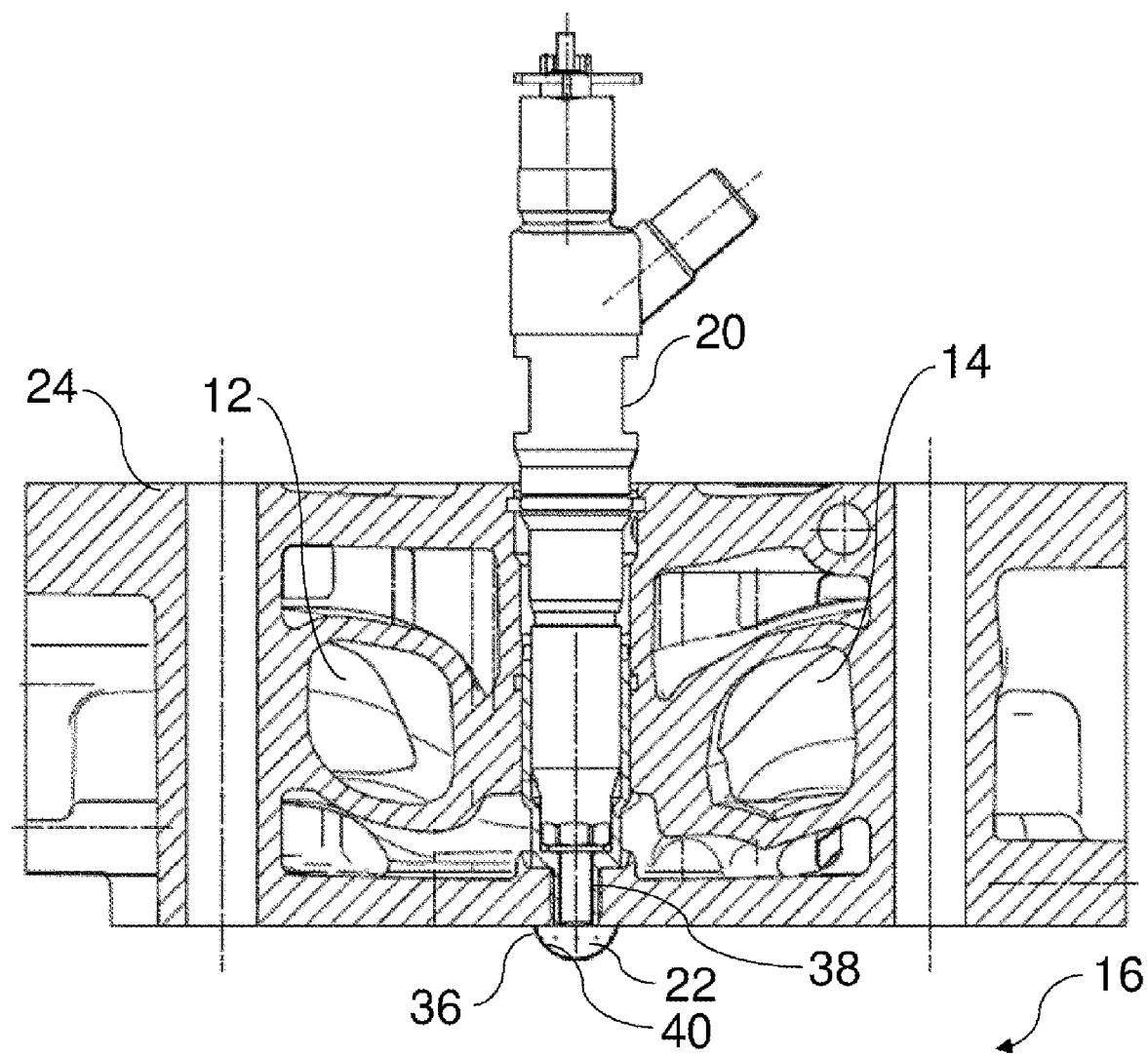
FIG. 2 is a sectioned view through an exemplary cylinder head.

The prechamber 22 may be integrated in the fuel injector 20, as indicated in FIG. 1. However, it is also possible to construct the prechamber 22 separately from the fuel injector 20, as illustrated in FIG. 2. The fuel injector 20 can then open, for example, directly in the prechamber 22. When the prechamber 22 and the fuel injector 20 are constructed separately, for example, the prechamber 22 may be formed at least partially by the cylinder head 24, by a cap element 36 which is fitted to the combustion chamber side of the cylinder head 24 (see FIG. 2) and/or by means of an assembly sleeve 38 (see FIG. 2) for the fuel injector 20. When the cap element 36 is used, for example, it may be screwed from below into the assembly sleeve 38.

The prechamber 22 may, for example, have a spherical, dome-like or rounded inner volume. The gas fuel can be supplied by means of the fuel injector 20 into the inner volume. The inner volume may be in a range between 0.5 cm$^3$ and 2.5 cm$^3$.

The prechamber 22 is connected to the main combustion chamber 16 in fluid terms by means of a plurality of through-openings (overflow openings). The through-openings are arranged in a state distributed symmetrically about a periphery of the prechamber 22. For example, from six to fourteen through-openings are included.

It is possible for an inner side face of the prechamber 22 to have a thermal insulator 40. The thermal insulator 40 may be configured as a coating of the inner side face. For example, the thermal insulator 40 may comprise a ceramic material. It is possible, for example, for the thermal insulator 40 to be vapor deposited on the inner side face, applied to the inner side face by means of plasma application or injected onto the inner side face by means of an injection method. The thermal insulator 40 can prevent or at least reduce a cooling of gas fuel in the prechamber 22 by walls of the prechamber 22.

In an inlet cycle, (combustion) air is supplied through the air inlet channel 12 and the opened air inlet valve 26 into the main combustion chamber 16. The piston 18 moves from the top dead center to the bottom dead center.

In the inlet and/or compression cycle, a main quantity of gas fuel is supplied via the fuel injector 20 into the prechamber 22, and in embodiments, may be blown in. It is contemplated that the gas fuel is supplied no longer than up to 100° KW before TDC in the compression cycle.

The main quantity of gas fuel is blown into the prechamber 22 at a pressure which is higher than a pressure in the prechamber 22 and the main combustion chamber 16, for example, higher than a final compression pressure of the internal combustion engine 10. In embodiments, the main quantity of gas fuel corresponds to between approximately 90% and approximately 98% of a quantity of gas fuel which is supplied in total during a (single) combustion cycle (comprising inlet, compression, expansion and outlet cycle).

The main quantity of gas fuel flows during the inlet and/or compression cycle via the through-openings out of the prechamber 22 into the main combustion chamber 16. The main quantity of gas fuel is mixed with the supplied air in the main combustion chamber 16 to form an air/gas fuel admixture. During the compression cycle/a piston movement of the piston 18 from the bottom dead center to the top dead center, the air/gas fuel admixture is compressed to form a homogeneous admixture, for example, as a result of the gas movements in the main combustion chamber 16.

So that there is no undesirable self-ignition in the main combustion chamber, it is envisioned that the method should be used only at comparatively low effective mean pressures. In this instance, the homogeneous admixture may reach a compression air ratio ($\lambda$) between approximately 2 and approximately 3. From a thermodynamic viewpoint, the method can consequently be used up to an effective mean pressure of approximately 10 bar, in an embodiment approximately 9 bar, and in one non-limiting embodiments approximately 8 bar or less. Consequently, the method may, for example, be carried out without the combustion air ratio ($\lambda$) for the air/gas fuel admixture in the main combustion chamber 16 falling below values of approximately 2.

The air/gas fuel admixture is, after the supply of the main quantity of gas fuel into the prechamber 22 has ended, during the compression cycle compressed or pushed via the through-openings out of the main combustion chamber 16 into the prechamber 22.

At the end of the compression cycle, before the piston 18 reaches the top dead center, an ignition quantity of gas fuel is supplied into the prechamber 22, and in embodiments blown in and/or supplied under high pressure. It is envisioned that the supply may be carried out between 30° KW and 15° KW prior to the top dead center. The supply time for the ignition quantity may be comparatively low, for example, from only 50 µs to 200 µs.

It is contemplated that the ignition quantity of gas fuel may be supplied by means of the same fuel injector 20 as the main quantity. In embodiments, the ignition quantity of gas fuel corresponds to between approximately 2% and approximately 10% of a quantity of gas fuel supplied in total during a (single) combustion cycle. The main quantity and the ignition quantity amount to 100%. For example, between 0.5 mg and 3 mg of gas fuel may be supplied as an ignition quantity.

In the prechamber 22, as a result of the supply of the ignition quantity into the air/gas fuel admixture there is formed in the prechamber 22 an air/gas fuel admixture which is richer and more ignition-friendly than the air/gas fuel admixture in the main combustion chamber 16. As can be appreciated, as a result of the supply of the ignition quantity in the prechamber, a combustion air ratio ($\lambda$) between 0.8 and 1.5, and in embodiments approximately 1, is achieved in the prechamber 22. At least during normal operation of the internal combustion engine 10, this richer air/gas fuel admixture self-ignites in the prechamber 22. A flame front which is produced in this instance expands out of the prechamber 22 through the through-openings into the main combustion chamber 16 and ignites the leaner, homogeneous air/gas fuel admixture at that location. The following homogeneous lean combustion in the main combustion chamber 16 enables a significant reduction of the nitrogen oxide emissions, in particular under partial load of the internal combustion engine 10.

It is possible that, under cold start conditions of the internal combustion engine, a supported self-ignition or remote ignition of the gas fuel is brought about. The self-ignition of the ignition quantity may, for example be supported by means of a glow plug which protrudes into the prechamber 22. A remote ignition can also be brought about by means of a spark plug which protrudes into the prechamber 22. The glow plug or spark plug is preferably only used under cold start conditions of the internal combustion engine 10.

The invention is not limited to the preferred embodiments described above. Instead, a large number of variants and modifications which also make use of the notion according to the invention and which are therefore included within the protective scope are possible. In particular, the present disclosure also claims protection for the subject-matter and the features of the dependent claims regardless of the claims which are referred to. In particular, the individual features of the independent claim 1 are disclosed independently of each other in each case. In addition, the features of the dependent claims are also disclosed independently of all the features of the independent claim 1. All range indications therein are intended to be understood to be disclosed in such a manner that so to speak all the values falling within the respective range are disclosed individually, for example, also as more narrow outer limits of the respective range.

LIST OF REFERENCE NUMERALS

10 Internal combustion engine
12 Air inlet channel
14 Exhaust gas outlet channel
16 Main combustion chamber
18 Piston
20 Fuel injector 22 Prechamber (pre-combustion chamber)
24 Cylinder head
26 Air inlet valve
28 Exhaust gas outlet valve
30 Connection rod
32 Crankshaft
34 Control unit
36 Cap element
38 Assembly sleeve
40 Thermal insulator

What is claimed is:

1. A method for operating an internal combustion engine, comprising:
supplying a main quantity of gas fuel into a main combustion chamber of the internal combustion engine via a prechamber, wherein the main combustion chamber is in fluid communication with the prechamber;
compressing and mixing air and the main quantity of gas fuel to form an air/gas fuel admixture during a movement of a piston in the main combustion chamber to a top dead center of a piston movement of the piston;
supplying an ignition quantity of gas fuel into the prechamber, before the piston reaches the top dead center, in order to form in the prechamber an air/gas admixture which is richer than the main combustion chamber;
self-igniting the air/gas fuel admixture in the prechamber; and
igniting the air/gas fuel admixture in the main combustion chamber by the self-ignited air/gas fuel admixture in the prechamber.

2. The method according to claim 1, wherein the internal combustion engine is a single-fuel internal combustion engine.

3. The method according to claim 1, wherein:
the main quantity of gas fuel is selected from the group consisting of methane and natural gas; or
the ignition quantity of gas fuel is selected from the group consisting of methane and natural gas.

4. The method according to claim 1, wherein the air and the main quantity of gas fuel are mixed during the compression to form a homogeneous air/fuel admixture in the main combustion chamber.

5. The method according to claim 4, wherein the homogeneous air/gas fuel admixture has a combustion air ratio ($\lambda$) that is greater than or equal to 2 or less than or equal to 3 so that a self-ignition of the air/gas fuel admixture in the main combustion chamber is inhibited; or
the homogeneous air/gas fuel admixture has a combustion air ratio ($\lambda$) which does not lead to self-ignition of the air/gas fuel admixture in the main combustion chamber.

6. The method according to claim 1, further comprising:
compressing a portion of the air/gas fuel admixture from the main combustion chamber into the prechamber during the movement of the piston to the top dead center; or
compressing a portion of the air/gas admixture from the main combustion chamber into the prechamber during the movement of the piston to the top dead center after the main quantity of gas fuel has been supplied,
wherein the ignition quantity is supplied into the portion of the air/gas fuel admixture which is compressed into the prechamber.

7. The method according to claim 1, wherein:
the richer air/gas fuel admixture in the prechamber has a combustion air ratio ($\lambda$) between 0.8 and 1.5, so that a self-ignition of the richer air/gas fuel admixture in the prechamber is enable; or the richer air/gas fuel admixture in the prechamber has a combustion air ratio ($\lambda$) which leads to a self-ignition of the richer air/gas fuel supply in the prechamber; or
the richer air/gas fuel admixture in the prechamber has a combustion air ratio ($\lambda$) of 1, so that a self-ignition of the richer air/gas fuel admixture in the prechamber is enable.

8. The method according to claim 1, wherein:
the main quantity of gas fuel corresponds to between 90% and 98% of a gas fuel quantity supplied in total per combustion cycle; or
the ignition quantity of gas fuel corresponds to between 2% and 10% of a gas fuel quantity supplied in total per combustion cycle; or
the main quantity of gas fuel and the ignition quantity of gas fuel amount to 100% of a gas fuel quantity supplied in total per combustion cycle.

9. The method according to claim 1, wherein:
an effective mean pressure is less than or equal to 10 bar so that a self-ignition of the air/gas fuel admixture in the main combustion chamber is initiated; or
an effective mean pressure is such that it does not lead to a self-ignition of the air/gas fuel admixture in the main combustion chamber; or
an effective mean pressure is less than or equal to 9 bar so that a self-ignition of the air/gas fuel admixture in the main combustion chamber is inhibited; or
an effective mean pressure is less than or equal to 8 bar so that a self-ignition of the air/gas fuel admixture in the main combustion chamber is inhibited.

10. The method according to claim 1, wherein:
the ignition quantity of gas fuel is supplied to the prechamber when the piston is in the region of the top dead center of the piston movement; or
the ignition quantity of gas fuel is supplied to the prechamber when the piston is in a range between 50 and 0 degrees crank angle before top dead center of the piston movement; or
the ignition quantity of gas fuel is supplied to the prechamber when the piston is in a range between 30 and 15 degrees crank angle before top dead center of the piston movement.

11. The method according to claim 1, wherein:
the main quantity of fuel and the ignition quantity of fuel have the same gas fuel, wherein the gas fuel is methane or natural gas; or
the main quantity of gas fuel is supplied during an inlet cycle up to a maximum of 100 degrees crank angle before the top dead center; or
the main quantity of gas fuel is supplied during a compression cycle up to a maximum of 100 degrees crank angle before the top dead center.

12. The method according to claim 1, further comprising supplying air into the main combustion chamber during an inlet cycle.

13. The method according to claim 1, wherein:
the supply of the ignition quantity of fuel or the supply of the main quantity of fuel is carried out in a gaseous manner; or
the supply of the main quantity of fuel is carried out temporarily before or spaced apart from the supply of the ignition quantity of fuel; or
the supply of the ignition quantity of fuel and the supply of the main quantity of fuel are carries out by the same fuel injector; or the supply of the ignition quantity of fuel and the supply of the main quantity of fuel are carried by the same supply line of the same fuel injector; or the supply of the ignition quantity of fuel and the supply of the main quantity of fuel are carried out at the same supply pressure.

14. The method according to claim 1, wherein:

the supply of the ignition quantity of fuel or the supply of the main quantity of fuel is carried out by means of a piezo fuel injector; or the supply of a pilot quantity of fuel or the supply of the main quantity of fuel is carried out by a fuel injector which is activated by means of an electromagnet.

15. The method according to claim 1, wherein:

an inner side face of the prechamber has a thermal insulator; or an inner side face of the prechamber has a thermal insulator in the form of a thermally insulating coating.

16. The method according to claim 1, wherein:

self-ignition of the air/gas fuel admixture in the prechamber is carried out during normal operation of the internal combustion engine; and the method further comprises:

remote ignition of the air/gas fuel admixture in the prechamber by a means of a spark plug in the case of a cold start of the internal combustion engine; or preheating the prechamber by means of a glow plug and self-ignition of the air/gas fuel admixture in the preheated prechamber in the case of a cold start of the internal combustion engine.

17. The method according to claim 1, wherein:

the prechamber has a volume in a range between 0.5 cm$^3$ and 2 cm$^3$; or the prechamber is connected to the main combustion chamber by means of a plurality of through-openings which are arranged in a distributed manner; or the prechamber is connected to the main combustion chamber by means of 6 to 14 through-openings which are arranged in a distributed manner; or the prechamber is integrated in a fuel injector for the ignition quantity of fuel or the main quantity of fuel; or the prechamber is constructed separately from a fuel injector for the ignition quantity of fuel or the main quantity of fuel; or the prechamber is arranged centrally with respect to the main combustion chamber.

18. An internal combustion engine, comprising:

a main combustion chamber;

a prechamber in fluid communication with the main combustion chamber; and a piston operably disposed within a portion of the main combustion chamber, wherein a main quantity of gas fuel is supplied to the main combustion chamber via the prechamber, wherein movement of the piston in the main combustion chamber to a top dead center of piston movement compresses and mixes air and the main quantity of fuel to form an air/gas fuel admixture, wherein the air/gas fuel admixture is self-ignited in the prechamber to effectuate a corresponding ignition of the air/gas fuel admixture in the main combustion chamber.

19. A motor vehicle, comprising:

an internal combustion engine, the internal combustion engine including:

a main combustion chamber;

a prechamber in fluid communication with the main combustion chamber; and a piston operably disposed within a portion of the main combustion chamber, wherein a main quantity of gas fuel is supplied to the main combustion chamber via the prechamber, wherein movement of the piston in the main combustion chamber to a top dead center of piston movement compresses and mixes air and the main quantity of fuel to form an air/gas fuel admixture, wherein the air/gas fuel admixture is self-ignited in the prechamber to effectuate a corresponding ignition of the air/gas fuel admixture in the main combustion chamber.

20. The motor vehicle according to claim 19, wherein the motor vehicle is a utility vehicle.

* * * * *